United States Patent [19]

Tanaka et al.

[11] Patent Number: 4,492,783

[45] Date of Patent: Jan. 8, 1985

[54] BINDER FOR OBTAINING A CERAMIC MOLDED GREEN BODY

[75] Inventors: Taku Tanaka; Hitoshi Maruyama, both of Kurashiki; Takuji Okaya, Nagaokakyo; Koichi Kajitani, Kurashiki, all of Japan

[73] Assignee: Kuraray Co., Ltd., Kurashiki, Japan

[21] Appl. No.: 571,373

[22] Filed: Jan. 16, 1984

[30] Foreign Application Priority Data

Jan. 14, 1983 [JP] Japan ............................ 58-4472

[51] Int. Cl.³ ............................................ C08L 3/22
[52] U.S. Cl. ........................... 524/430; 524/431; 524/432; 524/433; 524/435; 524/403; 524/413; 525/60
[58] Field of Search .................... 525/60; 524/430

[56] References Cited

U.S. PATENT DOCUMENTS

| | | | |
|---|---|---|---|
| 3,519,701 | 7/1970 | Pilato et al. | 525/60 |
| 3,525,723 | 8/1970 | Masuda et al. | 525/60 |
| 3,553,152 | 1/1971 | Kershaw et al. | 525/60 |
| 3,644,308 | 2/1972 | Carpentier | 525/60 |
| 3,684,784 | 8/1972 | Marze | 525/60 |
| 4,070,530 | 1/1978 | Hobbs | 525/60 |
| 4,144,388 | 3/1979 | Yatsu et al. | 525/60 |

*Primary Examiner*—Paul R. Michl
*Assistant Examiner*—Alex H. Walker
*Attorney, Agent, or Firm*—Oblon, Fisher, Spivak, McClelland & Maier

[57] ABSTRACT

A binder for obtaining a ceramic molded green body which comprises a modified polyvinyl alcohol having either (A) a hydrophobic group having a hydrocarbyl group of 4 or more carbon atoms or (A) plus (B) an ionic hydrophilic group in the side chain.

14 Claims, No Drawings

BINDER FOR OBTAINING A CERAMIC MOLDED GREEN BODY

BACKGROUND OF THE INVENTION

1. Field of the Invention

This invention relates to a binder suitable for obtaining ceramic molded green body. More specifically, high strength, high density and high uniformity binders, suitable for obtaining ceramic green tape which is soft, has high strength and excellent surface smoothness, are disclosed.

2. Description of the Prior Art

Ceramics have recently been extensively employed in various applications such as electronic materials, magnetic materials, optical materials, high temperature materials and the like. From these various applications, improvements in the properties and characteristics of the ceramics are necessary and have been eargerly sought. For example, with respect to such properties as thermal, electrical, and mechanical, products having higher density and higher uniformity are greatly desired. In the fields of mechanical parts, electrical parts and the like, products of greater size and of more complicated shapes are favored. In order to realize these requirements, a variety of studies have been conducted both with respect to the starting ceramic powder material and the method for molding.

In the past, as to the method for improving the thermal, electric, mechanical, optical and like properties of ceramic products, there has been proposed a method for upgrading the purity of the starting material powder as well as a method for employing a powder having a small particle diameter. However, difficulties are encountered when employing these methods. For example, such methods reduce the plasticizing of substances derived from impurities in the starting material or an increase in the particle surface area which, in turn, requires a greater amount of the organic binder.

On the other hand, when making a larger sized product or one of a more complicated design, the a molded green body from which the product is produced, requires higher strength when the molded green body (non-sintered product) is handled or treated. According to conventional techniques, an increased amount of an organic binder has been employed.

However, to increase the amount of the organic binder relative to the starting material powder has problems in the following areas:

1. Problems in the Debindering Operation

The molded green body is subjected to a debindering operation prior to sintering, but if the amount of the organic binder is too great at that time, large amounts of heat and gas are generated, and thus there is a risk of cracking due to explosion etc. and, in addition, a longer time for debindering is required.

2. Problems of Impurities

The addition of a large amount of an organic binder can give rise to the incorporation of impurities or an increase of the carbonized residue after sintering of the molded green body, and thereby greatly reducing the purity of the final product.

3. Problems Relating to Dimensional Accuracy

With an increase in the amount of the organic binder, the degree of shrinkage is much greater when the molded green body is sintered and thus the dimensional accuracy of the final product is reduced.

In order to solve these problems, binders such as polyvinyl alcohol (hereinafter referred to as PVA), methyl cellulose, vinyl acetate polymer emulsions illustrated in the comparative examples described hereinbelow have been studied. However, binders which can provide a high strength, a high density and a high uniform molded green body by the addition of small amounts thereof have not as yet been found.

For producing ceramic green tape (or sheet), there has gerally been employed a process which comprises dissolving a binder such as a polyvinyl butyral resin in an organic solvent such as methyl ethyl ketone, butyl acetate, and alkyl alcohols, mixing with it a ceramic powder for many hours to process it into a slip, followed by deaerating, processing it into a sheet on a carrier film using a blade having a predetermined thickness, and drying by heating to form a green tape.

However, the above described conventional molding method employing an organic solvent has the following problems:

(1) Environmental problems and problems of exposure to humans created by the use of organic solvents.
(2) Potential for explosion and fire during the handling of the organic solvents.
(3) The material cost of the solvent for producing green tape is expensive.
(4) There is the necessity to use equipment which is explosion-proof and at the same time provide a device for recovering the organic solvent. This results in the plant cost being expensive.

In order to solve these problems, there has been proposed a molding method of employing a water-soluble organic polymer such as PVA as a binder.

Although this method has the advantage that it can solve most of the above-described problems, it has the drawback in that prior to the stage for molding the green tape, the ceramic powder tends to form a flocculate structure in an aqueous slip and thus the viscosity of the slurry deviates greatly from Newtonian flow. Additionally, the flowability of the slip and the dispersibility of the ceramic powder are poor, and thus a uniform green tape having high surface smoothness cannot easily be obtained.

The use of the water-soluble polymers such as PVA also creates further problems. For water-soluble polymers there is no plasticizer which has high plasticizing efficiency. Also, there is the problem that when a plasticizer such as glycerin is employed in a large amount in order to impart softness to the green tape, the surface of the green tape becomes tacky due to migration of the plasticizer.

SUMMARY OF THE INVENTION

In accordance with the present invention, it has been discovered that a binder, comprising a modified PVA having either (A) a hydrophobic group containing a hydrocarbyl moiety of 4 or more carbon atoms or (A) and (B) an ionic hydrophilic group which has good miscibility with the ceramic powder upon preparation of the aqueous kneaded product, can provide a high strength molded green body by various molding techniques which requires only small amounts of the binder.

Further, in accordance with the present invention, because only a small amount of the binder is used, the molded green body obtained by the process of the present invention has superior properties and characteristics for the preparation of ceramic products. Exemplary of such improved, superior properties are that the degree of shrinkage is very small when the molded green body is subjected to sintering and thus the dimensional accuracy of the final product is good. Additionally, since the density after sintering is high, the overall quality of the final product is very good.

Still further, in accordance with the present invention, the ceramic green tape, obtained by employing the water-soluble modified PVA binder of the invention, is soft, has high strength, excellent surface smoothness and a high degree of uniformity.

These and other aspects of the invention will become clear to those skilled in the art upon the reading and understanding of the specification.

DETAILED DESCRIPTION OF THE PREFERRED EMBODIMENTS

The (A) hydrophobic group of the modified PVA binder in accordance with the present invention contains a large aliphatic hydrocarbon group of 4 or more carbon atoms, wherein the preferred number of carbon atoms is 6–20, and most preferably 8–18. An alkyl group is suitable as the hydrocarbon group. It has been found that, if the number of carbon atoms is 3 or less, a high strength molded green body by use of a small amount of binder cannot be obtained. An amount of the hydrophobic group incorporated in the PVA binder is desirably in the range of from about 0.1 mole % to about 15 mole %. The desired properties are not obtained with the amount of less than 0.1 mole %. Likewise, when more than 15 mole % is incorporated, good results are not always obtainable, probably because the water solubility of the modified PVA is reduced to become water insoluble (although this is somewhat dependent on the amount of the hydrophilic group incorporated) or the properties inherent to PVA such as its film forming properties are lost. The preferred amount of the hydrophobic group is about 0.5 to about 10 mole %.

Furthermore, the amount of the (B) ionic hydrophilic group incorporated in the modified PVA according to the present invention is desirably in the range of from 0 mole % to about 15 mole %. When the amount of the hydrophobic group incorporated is small, no problem exist because the thus modified PVA will be water soluble even if the ionic hydrophilic group is not present. However, in the case where the amount of the hydrophobic group is large, then it is necessary to render the system water-soluble by incorporating an ionic hydrophilic group. It is pointed out that the incorporation of more than 15 mole % of the ionic hydrophilic group is ineffectual and not cost effective, because its effect at this amount has been maximized and thus further improvement in performance cannot be expected. The preferred amount of the ionic hydrophilic group is in the range of about 0.5 to 10 mole %.

According to the present invention, as a method of incorporating the (A) hydrophobic group containing a hydrocarbyl group of 4 or more carbon atoms into the side chain of PVA, there may be mentioned the method of copolymerizing an ethylenically unsaturated monomer having a hydrocarbyl group of 4 or more carbon atoms with vinyl acetate followed by saponification. In this method, as the ethylenically unsaturated monomer, there may be mentioned, alkyl vinyl ethers such as butyl vinyl ether, lauryl vinyl ether, stearyl vinyl ether and isoamyl vinyl ether; α-olefins such as heptene-1, octene-1, docene-1, dodecene-1 and tetradecene; straight chain aliphatic vinyl esters such as vinyl laurate, vinyl stearate, vinyl myristate and vinyl palmitate, branched chain aliphatic acid vinyl esters such as vinyl ester of branched chain aliphatic acid having 8 carbon atoms in said branched chain hydrocarbon; and N-alkyl-substituted-(meth)acrylamides such as N-octyl(methyl)acrylamide, N-butyl(meth)acrylamide, N-dodecyl(meth)acrylamide, N-tetradecyl(meth)acrylamide. Among the above listed ethylenically unsaturated monomers, branched chain aliphatic acid vinyl esters, vinyl ethers and N-alkyl-substituted-(meth)acrylamides wherein each has a hydrocarbon group of from 6 to 20 carbon atoms are preferred. As a second method, there may be mentioned a method of incorporating a hydrophobic group by post-modifying an unmodified PVA with an aliphatic monoaldehyde.

As the method of incorporating the (A) hydrophobic group having a hydrocarbyl group of 4 or more carbon atoms and the (B) ionic hydrophilic group into the side chain of PVA, there may be mentioned the method of copolymerizing vinyl acetate with the aforementioned ethylenically unsaturated monomer having a hydrocarbon group of 4 or more carbon atoms and an ethylenically unsaturated monomer having an ionic hydrophilic group followed by saponification.

The ethylenically unsaturated monomer having an ionic hydrophilic group includes an ethylenically unsaturated monomer having an anionic or cationic hydrophilic group. Examples of ethylenically unsaturated monomers having an anionic hydrophilic group include ethylenically unsaturated carboxylic acids and the salts, lower alkyl esters and anhydrides thereof such as crotonic acid, itaconic acid, monomethyl maleate, methyl acrylate, and maleic anhydride, ethylenically unsaturated sulfonic acids and salts thereof such as vinylsulfonic acid and allylsulfonic acid salts, and N-(meth)acrylamidopropanesulfonic acid salts.

Examples of ethylenically unsaturated monomers having a cationic hydrophilic group are given by the following formulae (I), (II) and (III):

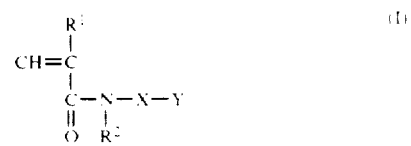

wherein $R^1$ and $R^2$ each represent a hydrogen atom or a lower alkyl group,

X is a group connecting the nitrogen atom in Y and the nitrogen atom in the amido group, and

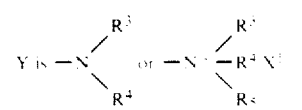

wherein $R^3$, $R^4$ and $R^5$ each represent a hydrogen atom or a lower alkyl group which may be optionally substituted; and $X^1$ is an anion;

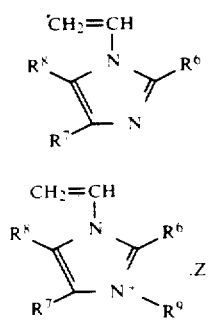

wherein

R⁵, R⁷, R⁸ and R⁹ each represent a hydrogen atom or a lower alkyl group or phenyl group, and Z⁻ is an anion.

Specific examples thereof include N-(1,1-dimethyl-3-dimethylaminopropyl)acrylamide, trimethyl-3-(1-acrylamido-1,1-dimethylpropyl)ammonium chloride, N-(1,1-dimethyl-3-dimethylaminobutyl)acrylamide, trimethyl-3-(1-acrylamido-1,1-dimethyl butyl)ammonium chloride, N-(1-methyl-1,3-diphenyl-3-diethylaminopropyl)methacrylamide, N-(3-dimethylaminopropyl)acrylamide, trimethyl-3-(1-acrylamidopropyl)ammonium chloride, N-(3-dimethylaminopropyl)methacrylamide, trimethyl-3-(1-methacrylamidopropyl)ammonium chloride, 1-vinylimidazole, 1-vinyl-2-methylimidazole, 1-vinyl-2-ethylimidazole, 1-vinyl-2-phenylimidazole, 1-vinyl-2, 4-dimethylimidazole, 1-vinyl-2,4,5-trimethylimidazole and the quaternized salts of these imidazoles.

Another method within the scope of the present invention for incorporating the ionic hydrophilic group into the side chain of PVA is a post-modification method of PVA, for example, by reacting PVA with sulfuric acid, chlorosulfonic acid and the like.

Further methods contemplated for incorporating the hydrophobic group and the ionic hydrophilic group into the side chain of PVA include a method of incorporating both groups by post-modification of PVA and a method of incorporating the hydrophobic group into a copolymer saponified product of vinyl acetate and an ethylenically unsaturated monomer having an ionic hydrophilic group.

The degree of saponification of the modified PVA employed in this invention is not particularly critical and the water-soluble range of PVA is generally sufficient. The preferred degree of saponification of the modified PVA is in the range of about 80 to about 99.5 mol %, and most preferably 88 to 98.5 mol %. The degree of polymerization is generally in the range of about 100 to about 3000 and preferably 200-2000.

Where the modified PVA of this invention is employed as the binder, examples of molding methods in which the binder characteristics are most beneficial include methods having an aqueous kneaded product in the molding step, such as press molding, extrusion molding, tape molding, and slurry molding. The aqueous kneaded product as herein used means a system which comprises the starting material powder, water and a binder. Additionally, it may further contain, depending on the necessity, additives such as a deflocculating agent, a plasticizer, a lubricant and the like. Moreover, an organic solvent may safely be present in an amount such not as to cause a problem associated with the dissolution of the modified PVA.

In the press molding method, which comprises drying the aqueous kneaded product to a granule form of a suitable particle diameter, supplying it to a suitable mold, and pressing it to achieve molding, the brittleness of the granules and the transmittance of the pressure create major problems. However, by employing the modified PVA in accordance to the present invention, the modified PVA has lubricating properties which assist to avoid such problems.

Where the modified PVA employed in this invention is to be used as a powder, it is generally found that it is beneficial to include the powder in the range of about 0.1 to about 20 parts by weight, and preferably 0.2-15 parts by weight. Further, the modified PVA is preferably blended with the ceramic powder in the form of an actual aqueous solution. It should be recognized, however, that the amount of modified PVA employed is dependent on such factors as the particular kind of ceramic powder, the method for molding, the shape of the molded part and the like.

While this invention is characterized by employing the aforesaid modified PVA as the binder, it may also be employed in combination with a deflocculating agent, a lubricant, a plasticizer and other such additives. Further, other binders may also be employed in combination with the modified PVA of the present invention. The deflocculating agent as herein used is a commonly employed deflocculating agent, which include such inorganic deflocculating agents as sodium phosphate, sodium hydroxide, sodium citrate, and sodium linolate and such organic deflocculating agents as amines, pyridine, piperidine, metal salts or ammonium salt of polyacrylic acid, and polyoxyethylene nonyl phenol ether. The preferred amount of the deflocculating agent incorporated is about 0.005 to about 5% by weight based on the ceramic powder.

As plasticizers within the scope of the invention, there may be mentioned glycols, polyethylene glycol, glycerin, and triols. The preferred amount of the plasticizer incorporated as 0 to about 10% by weight based on the ceramic powder. Further, the lubricant may be any of the conventional or known lubricants which includes natural wax such as bee wax and vegetable wax, synthetic wax such as paraffin wax, microcrystalline wax, low molecular weight polyethylene and its derivatives, fatty acids such as stearic acid, lauric acid etc., metal salts of fatty acids such as magnesium stearate, and calcium stearate, fatty acid amides such as oleic acid amide and stearic acid amide, polyethylene glycol and the like. They may be in the form of an aqueous dispersion. The preferred amount of the lubricant incorporated is 0 to about 10% by weight based on the ceramic powder.

The binder employed in combination with the modified PVA according to the present invention may be any known or conventional binder so long as it does not interfere with the desired characteristics and effect of the present invention. Examples of other binders are as follows: starches, sugars and their derivatives, rubbers, soluble proteins, cellulose derivatives, synthetic water-soluble polymers such as PVA, polyvinylpyrrolidone, polyacrylic acid amide, isobutylene-maleic anhydride copolymers, homopolymers and copolymers of acrylic acid, methacrylic acid and their esters, may also be employed. Illustrative of other binder materials there may be mentioned aqueous dispersions of a polymer of one or more monomers, for example, olefins such as ethylene, propylene, isobutylene and 1-hexene, diolefins such as butadiene, isoprene etc., vinyl esters such as vinyl propionate, vinyl acetate, and vinyl stearate, vinyl ethers such as stearyl vinyl ether, and lauryl vinyl ether, unsaturated carboxylic acids such as acrylic acid, methacrylic acid, crotonic acid, maleic acid, itaconic acid and their esters, and polymerizable aryls such as stryene. The aqueous dispersion of these polymers may be obtained by emulsion polymerization or suspension polymerization of the above-mentioned monomers. When emulsion polymerization is conducted, it is preferred that the modified PVA of the present invention is employed as a protective colloid to obtain the aqueous polymer dispersion. In this case, the amount of PVA employed as the protective colloid may be in the range of about 5 to about 2000 parts by weight and preferably 10-1000 parts by weight, per 100 parts by weight of the monomer.

The ceramic powder for which the modified PVA of this invention is employed is a metal oxide or non-oxide powder, or non-metal oxide or non-oxide powder usable in ceramic production. Further, the composition of these powders may be either a single composition or in a compound form and they may be employed either singly or in combination. The constituting element of the metal oxide or non-oxide may consist of either a single element or a plurality of elements which may either be cationic or anionic. Moreover, a system containing additives for improving the characteristics of the oxide or non-oxide may also be employed.

Specific examples thereof include oxides, carbides, nitrides, borides, and sulfides of Li, K, Be, Mg, B, Al, Si, Cu, Ca, Sr, Ba, Zn, Cd, Ga, In, lanthanides, actinides, Ti, Zr, Hf, Bi, V, Nb, Ta, W, Mn, Fe, Co, and Ni. Further, specific examples of oxide powders may contain plurality of metal elements which are generally called double oxides and are classified according to their crystal structure. For example, there are oxide powders having a perovskite structure such as $NaNbO_3$, $SrZrO_3$, $PbZrO_3$, $SrTiO_3$, $BaZrO_3$, $PbTiO_3$, and $BaTiO_3$; those having spinnel structure such as $MgAl_2O_4$, $ZnAl_2O_4$, $CoAl_2O_4$, $NiAl_2O_4$, and $MgFe_2O_4$; those having an ilmenite structure such as $MgTiO_3$, $MnTiO_3$, and $FeTiO_3$; and those having a gernet structure such as $Gd_2Ga_5O_{12}$ and $Y_3Fe_5O_{12}$.

The modified PVA employed in this invention is effective regardless of the particle diameter and shape of the above-described ceramic powder, but the more minute the powder becomes, the more significant the problem of pelletization becomes, and thus the effectiveness of the modified PVA is even further manifested especially with ceramic powders having an average particle diameter of $20\mu$ or less.

Among the previously discussed ceramic powders, the modified PVA employed in this invention is particularly suitable for the oxide powders, particularly, metal oxide powders for producing electronic materials, magnetic materials, optical materials, high temperature materials and the like.

By the ceramic molded green body according to the present invention, a porcelain product exhibiting excellent strength and excellent quality may be obtained.

This invention will now be described in more detail in the form of the following non-limiting examples and comparative examples. These examples are afforded in order that those skilled in the art may more readily understand the present invention and specific preferred embodiments thereof in accordance with the foregoing description. The scope of the invention, however, is not limited to the following examples.

EXAMPLE 1

Production of Modified PVA (A)

770 parts of vinyl acetate, 1370 parts of methyl alcohol and 25.1 parts of lauryl vinyl ether were charged into a polymerizing vessel and polymerized in the conventional manner. After expelling the unreacted vinyl acetate, the resultant polymer is saponified using sodium hydroxide as a catalyst.

The obtained PVA was reacted with chlorosulfonic acid in a pyridine medium, and then neutralized to obtain a modified PVA (A). From the assay results, said modified PVA was found to contain 0.9 mole % of lauryl ether groups, 1.0 mole % of sulfonic acid ester groups, a degree of saponification of 99.1%, a degree of polymerization of 650, and a viscosity in 4% aqueous solution at 20° C. of 10 centipoise.

Press Molding 0.3 Part of polyacrylic acid ammonium salt was added as a deflocculating agent to 100 parts of an alumina powder (99.8% purity) and 100 parts of water and pulverized in a ball mill for 90 hours, after which it was mixed thoroughly with 2 parts calculated as solids of an aqueous solution of the modified PVA (A), 1.5 parts of a stearic acid emulsion and 1 part of glycerin. This slurry was pelletized by spray drying. The obtained pelletized product (granules) was of a spherical form approaching the real spheres and had good flowability. These granules were pressed by an isostatic pressure press to obtain a cylindrically molded green body having an inner diameter of 15 mm, a length of 500 mm and a thickness of 5 mm. At that time, adhesion to the mold did not occur and it was easy to release from the mold. The surface of the molded green body was observed under a microscope, to find that the granules had been adequately smashed. When the strength of the molded green body was evaluated by a bending test, the strength was much greater than the case where the unmodified PVA was employed as a binder in Comparative Example 1 described below. Further, cutting and drilling of this molded part presented no difficulty.

Comparative Example 1

Similar procedures to Example 1 were conducted except that the modified PVA (A) of Example 1 was replaced by an unmodified PVA (degree of saponification: 88 mole %; degree of polymerization: 1700) (Kurary Poval 217). As described above, the strength was much lower than that obtained by employing the modified PVA (A) of Example 1. Further, the cutting and drilling of the molded green body were difficult.

EXAMPLE 2

Production of Modified PVA (B)

2100 Parts of vinyl acetate, 55 parts of a branched chain aliphatic acid vinyl ester VeoVa-10 ® (trademark) produced by Shell Chemical Co. of the formula is

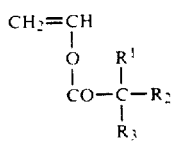

wherein the total carbon atoms in $R_1$, $R_2$ and $R_3$ which each is alkyl are 8, 3600 parts of methyl alcohol and 58 parts of sodium allylsulfonate were polymerized in the conventional manner. The unreacted vinyl acetate was expelled, and the resultant polymer solution was saponified using sodium hydroxide as a catalyst. The obtained modified PVA contained 1.2 mole % of hydrocarbon groups (versatic acid ester moiety) and 2.0 mole % of sulfonic acid groups, had a degree of saponification of 97.8 mole %, a degree of polymerization of 550, and a viscosity in 4% aqueous solution at 20° C. of 7 centipoise.

Press Molding

100 Parts of alumina (99.8% purity), 50 parts of water and 0.3 part of a polyacrylic acid ammonium salt deflocculating agent were ground in a ball mill for 90 hours, and modified PVA (B) aqueous solution was added in an amount of 2 parts as solids and mixed uniformly with the powder. Granules (particle diameter 100±20μ) were prepared from this slurry, and molded into a rectangular form of a width of 20 mm, a length of 100 mm and a thickness of 10 mm by pressing (1.2 ton/cm²) using a mold. The results from test evaluations are shown in Table 1.

Comparative Example 2

Similar molding process to Example 2 was conducted by replacing the binder in Example 2 by an unmodified PVA (degree of saponification: 88 mole %; degree of polymerization: 500) (Kuraray Poval 205), methyl cellulose and a vinyl acetate emulsion, respectively. The results from test evaluation are shown in Table 1.

EXAMPLE 3

Various modifications were conducted according to the process for the production of the modified PVA in Example 2 to prepare modified PVA (C)-(K), and subsequently employed as binders. Molding was conducted in a similar manner as in Example 2. The results from test evaluations are summarized in Table 1.

TABLE 1

| | | | | | Binders and Their Molding Properties and Physical Properties of Molded Green Body | | | | |
|---|---|---|---|---|---|---|---|---|---|
| | Sample No. | Binder | Monomer Incorporating Hydrophobic Group | Monomer Incorporating Hydrophilic Group | Hydrophobic Group (mole %) | Hydrophilic Group (mole %) | Release Properties | Uniformity | Strength of Molded Green Body (Toughness) | Workability |
| Example 2 | 3 | Modified PVA (B) | Veova-10 ® | Sodium allylsulfonate | 1.2 | 2.0 | o | o | 3.0 | o |
| Example 3 | 4 | Modified PVA (C) | Veova-10 ® | Itaconic acid | 0.7 | 0 | o | o | 1.1 | Δ |
| | 5 | Modified PVA (D) | " | " | 1.0 | 1.0 | o | o | 1.5 | o |
| | 6 | Modified PVA (E) | " | " | 3.0 | 1.0 | o | o | 3.9 | o |
| | 7 | Modified PVA (F) | " | " | 4.0 | 3.0 | o | o | 8.5 | o |
| | 8 | Modified PVA (G) | " | " | 4.0 | 6.0 | o | o | 6.0 | o |
| | 9 | Modified PVA (H) | Heptene | Maleic anhydride | 2.0 | 1.0 | o | o | 1.3 | o |
| | 10 | Modified PVA (I) | Stearyl vinyl ether | " | 1.2 | 1.0 | o | o | 2.1 | o |
| | 11 | Modified PVA (J) | Veova-10 | Trimethyl-3-(1-methacrylamidopropyl)ammonium chloride | 2.0 | 1.0 | o | o | 2.3 | o |
| | 12 | Modified PVA (K) | Octylacrylamide | Maleic anhydride | 3.0 | 1.0 | o | o | 2.8 | o |
| Comparative Example 2 | 13 | PVA-205 | — | — | — | — | o | x | 1.0 | Δ |
| | 14 | Methyl cellulose | — | — | — | — | Δ | x | 1.0 | Δ |
| | 15 | Vinyl acetate polymer emulsion | — | — | — | — | Δ | x | 0.3 | x |

*Strength of Molded Green Body: This was conducted by a three-point bending test, the energy required for breaking the molded green body (toughness) was determined from the s-s curve, and expressed relative to the toughness, taken as 1.0, of the molded green body when PVA-205 was employed as the binder
**Workability was evaluated by the degree of difficulty by conducting cutting with a knife and drilling with a drill
o: Working is easy
Δ: Working is difficult
x: Working is very difficult

EXAMPLE 4

Conventional procedures were employed to obtain a modified PVA consisting of a polyvinyl acetate ester type copolymer containing 3.5 mole % of Veova-10 ® as a hydrophobic component and 1.5 mole % of itaconic acid as an ionic hydrophilic component, 93 mole % of vinyl acetate ester component having been saponified, its degree of polymerization being 700, and its viscosity in 4% aqueous solution being 32 centipoise.

100 Parts of an alumina powder (average particle diameter: 1.5μ; 96% purity) was mixed with 6 parts of the above PVA copolymer as a binder, 3 parts of glycerin as a plasticizer, 1 part of polyoxyethylene nonyl phenol ether (HLB value 17.5) as a dispersant and 50 parts of deionized water, and kneaded in a ball mill to obtain an aqueous slip. Air bubbles within the slip were removed by a vacuum defoaming device to obtain a uniform slip. The slurry viscosity was adjusted, and it was drawn into a sheet form on a polyester sheet using a blade having a predetermined clearance to produce a green tape.

The aqueous slip had good flowability, and the obtained tape had excellent flexibility and elasticity, was easy to handle and had a smooth surface. Problems due to migration of the plasticizer were not observed.

When said green tape was sintered at 1600° C., a porcelain comparable to or better than that obtained by the conventional process (organic solvent system) of Comparative Example 3, as shown in Table 2 was obtained.

Comparative Example 3

100 Parts of an alumina powder (average particle diameter: 1.5μ; 96% purity) was mixed with 8 parts of polyvinyl butyral (PVB) as a binder, 3 parts of dibutyl phthalate (DBP) as a plasticizer, 2 parts of purified sardine oil as a dispersant and 26 parts of cyclohexanone, 10 parts of ethanol and 14 parts of toluene as solvents. A green tape was obtained by similar procedures as in Example 4. The evaluation of the physical properties are shown in Table 2.

TABLE 2

|  | Sample No. | |
| --- | --- | --- |
|  | 16 Example 4 | 17 Comparative Example 3 |
| Binder | Modified PVA | PVB |
| Plasticizer | Glycerin 3 pts. | DBP 3 pts. |
| Dispersant | Polyoxyethylene nonyl phenol ether 1 pt. | Purified sardine oil 2 pts. |
| Density of Green Sheet (g/cm³) | 2.30 | 2.12 |
| Surface Roughness after sintering (μm) | 0.35 | 0.41 |
| Apparent Specific Gravity after sintering (g/cm³) | 3.77 | 3.74 |

EXAMPLE 5

Production of Binder

A polyvinyl acetate type copolymer containing 4.0 mole % of a Veova-10 ® as a hydrophobic component and 3.0 mole % of itaconic acid as a hydrophilic component was obtained, and this product was saponified to synthesize a modified PVA, 96.5% of the vinyl acetate moiety of which had been saponified, and having a degree of polymerization of 450. Its viscosity in 4% aqueous solution at 20° C. was 8.0 centipoise.

Thereafter, 100 parts of the above PVA and 860 parts of ion exchanged water were charged into an autoclave equipped with an electromagnetic rotary stirrer and a temperature controllable jacket, and the temperature was raised while stirring to dissolve it. After cooling, 400 parts of a vinyl acetate monomer was added to this system while stirring and further while the pressure was being adjusted to 45 kg/cm² by the introduction of ethylene gas, the temperature inside the system was raised to 60° C. At a temperature of 60° C., a hydrogen peroxide aqueous solution and a sodium pyrosulfite aqueous solution were added, and emulsion polymerization was effected for 3 hours. At the end of the polymerization, the pH was adjusted to 6.0 with ammonia water. The obtained ethylene-vinyl acetate copolymer aqueous dispersion contained no coagulated substanced, and was an aqueous dispersion having a solids concentration of 35.6%, an ethylene content of 14.8% by weight and good mechanical stability and storage stability.

Tape Molding

100 Parts of an alumina powder (average particle diameter 2μ; 96% purity) was mixed with 6 parts calculated as solids of the aforesaid binder, 0.1 part of glycerin and 0.5 part of dibutyl phthalate as plasticizers, 0.5 part of polyoxyethylene nonyl phenol ether (HLB value 17.5) as a dispersant and 25 parts of deionized water.

This starting material mixture was placed in an alumina ball mill, and by using alumina balls in an amount of about 2 times the volume of the total starting materials, kneading was conducted for about 20 hours to obtain an aqueous slip. Air bubbles within the slip were removed by a vacuum defoaming device to obtain a uniform slip. The slurry viscosity was adjusted, and it was drawn into a sheet form on a polyester sheet using a blade having a predetermined clearance to produce a green tape.

The resulting aqueous slip was obtained as a uniform dispersion having good flowability, and the obtained tape had excellent flexibility and elasticity, was strong and easy to handle, and had a smooth surface.

The above green tape was sintered at 1600° C., resulting in an excellent porcelain product as shown in Table 3.

EXAMPLE 6

Production of Binder

A polyvinyl acetate ester type copolymer, containing 1 mole % of lauryl vinyl ether as a hydrophobic component and 2 mole % of itaconic acid as a hydrophilic component, was saponified to obtain a modified PVA, 97.6% of the vinyl acetate component of which had been saponified, and having degree of polymerization of 650. The viscosity of this modified PVA in 4% aqueous solution at 20° C. was 20 centipoise. 100 Parts of this modified PVA and 1.0 part of disodium phosphate were dissolved in 600 parts of water, and kept at 65° C. By adding 16 parts of butyl methacrylate and 10 parts of a 5% aqueous solution of ammonium persulfate in N₂ atmosphere, the polymerization was initiated. After 15 minutes from initiating the reaction, 100 parts of butyl methacrylate was added continuously for 2 hours to effect the polymerization. After completion of the addition, the internal temperature was kept at 65° C. for an hour, then cooled, and the product was removed to find that it was a clean emulsion containing no coarse particles, and it was stable even after standing for 3 months.

Tape Molding

100 Parts of an alumina powder (average particle diameter 2μ; 96% purity) was mixed with 6 parts calculated as solids of the aforesaid binder, 0.5 part of 3-methyl pentan-1,3,5-triol (MPT) as a plasticizer, 0.7 part of dioctyl phthalate (DOP), 0.5 part of polyoxyethylene nonyl phenol ether (HLB value 17.5) as a dispersant and 25 parts of deionized water.

By similar procedures to Example 5, a green tape was produced.

The aqueous slip had good flowability, and the tape obtained from said aqueous slip had excellent flexibility and elasticity, was strong and easy to handle, and had a smooth surface. The evaluation of the physical properties are shown in Table 3.

TABLE 3

|  | Sample No. | |
|---|---|---|
|  | 18 Example 5 | 19 Example 6 |
| Binder | Binder of Ex. 5 | Binder of Ex. 6 |
| Plasticizer | Glycerin 0.1 pt. DBP 0.5 pt. | MPT 0.5 pt. DOP 0.7 pt. |
| Dispersant | Polyoxyethylene nonyl phenyl ether 1 pt. | Same as the left 1 pt. |
| Solvent | Ion exchanged water 25 pts. | Same as the left 25 pts. |
| Density of Green tape (g/cm³) | 2.31 | 2.30 |
| Surface Roughness after sintering (μm) | 0.35 | 0.38 |
| Apparent Specific Gravity after sintering (g/cm³) | 3.76 | 3.75 |

While the invention has been described and illustrated with reference to certain preferred embodiments thereof, those skilled in the art will appreciate that various changes, modifications and substitutions can be made therein without departure from the spirit of the invention. For example, temperature ranges and reactant ratios other than the preferred range may be applicable as a consequence of the nature of the various reactants employed as well as other such expected variations or differences in results are contemplated in accordance with the procedures and practices of the present invention. It is intended, therefore, that the invention be limited only by the scope of the claims which follow.

What is claimed is new and desired to be secured by Letters Patent of the United States is:

1. A composition for producing a ceramic molded green body which comprises 100 parts of ceramic powder and about 0.1 to about 20 parts of a binder which comprises a modified polyvinyl alcohol having either (A) a hydrophobic group having a hydrocarbyl group of four or more carbon atoms or (A) plus (B) an ionic hydrophilic group in the side chain.

2. The composition according to claim 1 wherein the hydrophobic group having a hydrocarbyl group of 4 or more carbon atoms is a hydrophobic group generated from the polymerization of at least one monomer selected from the group consisting of an aliphatic acid vinyl ester, an alkyl vinyl ether, an N-alkyl (meth)acrylamide and an α-olefin.

3. The composition according to claim 1 wherein the hydrophobic group having a hydrocarbyl group of 4 or more carbon atoms is a hydrophobic group generated from a branched chain aliphatic acid vinyl ester.

4. The composition according to claim 1 wherein the hydrophobic group having a hydrocarbyl group of 4 or more carbon atoms is a hydrophobic group having a hydrocarbyl group of 6-20 carbon atoms.

5. The composition according to claim 1 wherein the hydrophobic group having a hydrocarbyl group of 4 or more carbon atoms is a hydrophobic group having a hydrocarbyl group of 8-18 carbon atoms.

6. The composition according to claim 1 wherein the ionic hydrophilic group is an anionic hydrophilic group generated from the polymerization of at least one monomer selected from the group consisting of an ethylenically unsaturated carboxylic acid, its salt, lower alkyl ester or anhydride thereof and an ethylenically unsaturated sulfonic acid and its salt.

7. The composition according to claim 1 wherein the ionic hydrophilic group is a cationic hydrophilic group generated from the polymerization of at least one monomer having the formula (I), (II) or (III):

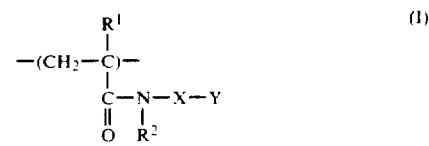

wherein
$R^1$ and $R^2$ each represents a hydrogen atom or a lower alkyl group,
X is a group connecting the nitrogen atom in Y and the nitrogen atom in the amide group, and

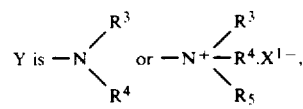

wherein $R^3$, $R^4$ and $R^5$ each represents a hydrogen atom or a lower alkyl group which may be optionally substituted, and $X^{1-}$ is an anion;

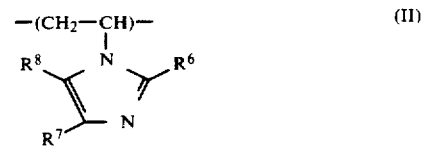

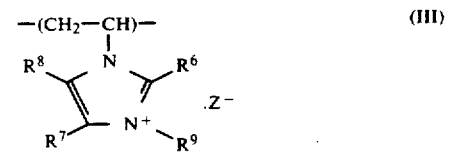

wherein
$R^6$, $R^7$, $R^8$ and $R^9$ each represents a hydrogen atom or a lower alkyl group or phenyl group, and
$Z^-$ is an anion.

8. The composition according to claim 1 wherein the hydrophobic group having a hydrocarbyl group of 4 or more carbon atoms is a hydrophobic group generated from a branched chain aliphatic acid vinyl ester and the ionic hydrophilic group is an anionic hydrophilic group generated from an ethylenically unsaturated carboxylic acid.

9. The composition according to claim 1 wherein the modified polyvinyl alcohol contains about 0.1 to about 15 mole % of a hydrophobic group having a hydrocarbyl group of 4 or more carbon atoms.

10. The composition according to claim 1 wherein the modified polyvinyl alcohol contains about 0.1 to about 15 mole % of a hydrophobic group having a hydrocarbyl group of 4 or more carbon atoms and 0.5 to about 10 mole % of an ionic hydrophilic group.

11. The composition according to claim 1 wherein the modified polyvinyl alcohol has a degree of polymerization of about 100 to about 3000 and a degree of saponification of about 80 to about 99.5 mole %.

12. The composition according to claim 1 wherein the ceramic molded green body is a ceramic green tape obtained by tape molding.

13. The composition according to claim 1 wherein the ceramic molded green body is a ceramic molded green body obtained by press molding.

14. The composition according to claim 1 wherein the ceramic molded green body is a ceramic green body obtained by extrusion molding.

* * * * *